(12) United States Patent
Tan et al.

(10) Patent No.: US 10,831,321 B2
(45) Date of Patent: Nov. 10, 2020

(54) PARALLEL SENSING TOUCH CONTROL DEVICE AND OPERATING METHOD THEREOF

(71) Applicant: PixArt Imaging Inc., Hsin-Chu County (TW)

(72) Inventors: Kok-Siang Tan, Penang (MY); Yu-Han Chen, Hsin-Chu County (TW); Meng-Lin Yu, Hsin-Chu County (TW); Kei-Tee Tiew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 92 days.

(21) Appl. No.: 15/957,726

(22) Filed: Apr. 19, 2018

(65) Prior Publication Data

US 2019/0324572 A1 Oct. 24, 2019

(51) Int. Cl.
*G06F 3/044* (2006.01)

(52) U.S. Cl.
CPC .... *G06F 3/044* (2013.01); *G06F 2203/04112* (2013.01)

(58) Field of Classification Search
CPC .......... G06F 3/044; G06F 2203/04112; G06F 3/04182; G06F 3/04166; G06F 3/0412
See application file for complete search history.

(56) References Cited

U.S. PATENT DOCUMENTS

| | | | | |
|---|---|---|---|---|
| 8,890,821 B2* | 11/2014 | Chang | .................. | G06F 3/0416 178/18.01 |
| 2008/0007539 A1* | 1/2008 | Hotelling | ................ | G06F 3/044 345/173 |
| 2010/0045614 A1* | 2/2010 | Gray | ....................... | G06F 3/044 345/173 |
| 2010/0321336 A1* | 12/2010 | Chou | ...................... | G06F 3/044 345/174 |
| 2012/0044199 A1* | 2/2012 | Karpin | .................. | G06F 3/0416 345/174 |
| 2012/0188201 A1* | 7/2012 | Binstead | ............... | G06F 3/0416 345/174 |
| 2013/0207925 A1* | 8/2013 | Ryshtun | ................ | G06F 3/0416 345/174 |
| 2015/0185922 A1* | 7/2015 | Chang | .................. | G06F 3/0416 345/174 |
| 2017/0205933 A1* | 7/2017 | Kwon | ................... | G06F 3/0418 |
| 2018/0150168 A1* | 5/2018 | Jung | ....................... | H03M 1/12 |
| 2018/0164915 A1* | 6/2018 | Karpin | ................... | G06F 3/044 |
| 2018/0188846 A1* | 7/2018 | Srivastava | ............ | G06F 3/0412 |
| 2019/0196654 A1* | 6/2019 | Jiang | ...................... | G01R 27/26 |

* cited by examiner

*Primary Examiner* — Grant Sitta
(74) *Attorney, Agent, or Firm* — Hauptman Ham, LLP

(57) ABSTRACT

There is provided a parallel sensing touch control device including a capacitive sensor array processed by differential unit. In one detection interval, the device is concurrently conducting more than one sensing electrode of the capacitive sensor array so as to reduce a scanning interval of the capacitive sensor array. The differential unit performs a differential operation on detected signals to cancel out common mode noise.

17 Claims, 14 Drawing Sheets

| | | | | | |
|---|---|---|---|---|---|
| row 17 | X | X | X | X | INp |
| row 16 | X | X | X | X | INp |
| row 15 | X | X | X | X | INp |
| row 14 | X | X | X | INp | INm |
| row 13 | X | X | X | INp | INm |
| row 12 | X | X | X | INp | INm |
| row 11 | X | X | INp | INm | X |
| row 10 | X | X | INp | INm | X |
| row 9 | X | X | INp | INm | X |
| row 8 | X | INp | INm | X | X |
| row 7 | X | INp | INm | X | X |
| row 6 | X | INp | INm | X | X |
| row 5 | INp | INm | X | X | X |
| row 4 | INp | INm | X | X | X |
| row 3 | INp | INm | X | X | X |
| row 2 | INm | X | X | X | X |
| row 1 | INm | X | X | X | X |
| row 0 | INm | X | X | X | X |
| | T0 | T1 | T2 | T3 | T4 |

|       | T0  | T1  | T2  | T3  | T4  | T5  | T6  | T7  | T8  | T9  | T10 | T11 | T12 |
|-------|-----|-----|-----|-----|-----|-----|-----|-----|-----|-----|-----|-----|-----|
| row 0 | INm | x   | x   | x   | x   | x   | x   | x   | x   | x   | x   | x   | x   |
| row 1 | INm | INm | x   | x   | x   | x   | x   | x   | x   | x   | x   | x   | x   |
| row 2 | INp | INm | INm | x   | x   | x   | x   | x   | x   | x   | x   | x   | x   |
| row 3 | INp | INp | INm | INm | x   | x   | x   | x   | x   | x   | x   | x   | x   |
| row 4 | x   | INp | INp | INm | INm | x   | x   | x   | x   | x   | x   | x   | x   |
| row 5 | x   | x   | INp | INp | INm | INm | x   | x   | x   | x   | x   | x   | x   |
| row 6 | x   | x   | x   | INp | INp | INm | INm | x   | x   | x   | x   | x   | x   |
| row 7 | x   | x   | x   | x   | INp | INp | INm | INm | x   | x   | x   | x   | x   |
| row 8 | x   | x   | x   | x   | x   | INp | INp | INm | INm | x   | x   | x   | x   |
| row 9 | x   | x   | x   | x   | x   | x   | INp | INp | INm | INm | x   | x   | x   |
| row 10| x   | x   | x   | x   | x   | x   | x   | INp | INp | INm | INm | x   | x   |
| row 11| x   | x   | x   | x   | x   | x   | x   | x   | INp | INp | INm | INm | x   |
| row 12| x   | x   | x   | x   | x   | x   | x   | x   | x   | INp | INp | INm | INm |
| row 13| x   | x   | x   | x   | x   | x   | x   | x   | x   | x   | INp | INp | INm |
| row 14| x   | x   | x   | x   | x   | x   | x   | x   | x   | x   | x   | INp | INp |
| row 15| x   | x   | x   | x   | x   | x   | x   | x   | x   | x   | x   | x   | INp |

FIG. 9

|    | T0  | T1  | T2  | T3  | T4  | T5  | T6  | T7  | T8  | T9  | T10 | T11 | T12 | T13 | T14 | T15 |
|----|-----|-----|-----|-----|-----|-----|-----|-----|-----|-----|-----|-----|-----|-----|-----|-----|
| R0 | INp | INm | INm | INm | x | x | x | x | x | x | x | x | x | x | x | x |
| R1 | INm | INp | INm | INm | x | x | x | x | x | x | x | x | x | x | x | x |
| R2 | INm | INm | INp | INm | x | x | x | x | x | x | x | x | x | x | x | x |
| R3 | INm | INm | INm | INp | x | x | x | x | x | x | x | x | x | x | x | x |
| R4 | x | x | x | x | INp | INm | INm | INm | x | x | x | x | x | x | x | x |
| R5 | x | x | x | x | INm | INp | INm | INm | x | x | x | x | x | x | x | x |
| R6 | x | x | x | x | INm | INm | INp | INm | x | x | x | x | x | x | x | x |
| R7 | x | x | x | x | INm | INm | INm | INp | x | x | x | x | x | x | x | x |
| R8 | x | x | x | x | x | x | x | x | INp | INm | INm | INm | x | x | x | x |
| R9 | x | x | x | x | x | x | x | x | INm | INp | INm | INm | x | x | x | x |
| R10 | x | x | x | x | x | x | x | x | INm | INm | INp | INm | x | x | x | x |
| R11 | x | x | x | x | x | x | x | x | INm | INm | INm | INp | x | x | x | x |
| R12 | x | x | x | x | x | x | x | x | x | x | x | x | INp | INm | INm | INm |
| R13 | x | x | x | x | x | x | x | x | x | x | x | x | INm | INp | INm | INm |
| R14 | x | x | x | x | x | x | x | x | x | x | x | x | INm | INm | INp | INm |
| R15 | x | x | x | x | x | x | x | x | x | x | x | x | INm | INm | INm | INp |

FIG. 11

| | T0 | T1 |
|---|---|---|
| row 17 | X | INp |
| row 16 | INm | X |
| row 15 | X | INp |
| row 14 | INm | X |
| row 13 | X | INp |
| row 12 | INm | X |
| row 11 | X | INp |
| row 10 | INm | X |
| row 9 | X | INp |
| row 8 | INm | X |
| row 7 | X | INp |
| row 6 | INm | X |
| row 5 | X | INp |
| row 4 | INm | X |
| row 3 | X | INp |
| row 2 | INm | X |
| row 1 | X | INp |
| row 0 | INm | X |

FIG. 16

PARALLEL SENSING TOUCH CONTROL DEVICE AND OPERATING METHOD THEREOF

BACKGROUND

1. Field of the Disclosure

This disclosure generally relates to a capacitive touch device and, more particularly, to a parallel sensing capacitive touch device capable of cancelling common-mode noise and reducing total power consumption, and an operating method thereof.

2. Description of the Related Art

The capacitive sensor array has been broadly applied to mobile electronic devices. Meanwhile, the mobile electronic devices generally adopt a liquid crystal display for showing messages and pictures to be watched by a user. However, the common-mode noise of the liquid crystal display can be randomly coupled to a signal band of the capacitive sensor array to cause errors.

In addition, the mobile electronic devices also need to reduce the power consumption as much as possible. In addition to reduce the backlight brightness of the liquid crystal display in a low power mode, sometimes a number of sampling points of each detection cell within a detection interval of the capacitive sensor array is decreased to shorten the scanning interval. However, decreasing the number of sampling points can degrade the signal-to-noise ratio (SNR) at the same time thereby degrading the detection sensitivity.

Accordingly, it is necessary to provide a capacitive touch device capable of cancelling common-mode noise and having low power consumption.

SUMMARY

The present disclosure provides a parallel sensing touch control device and an operating method thereof that cancel out common-mode noise by using a differential sensing technique.

The present disclosure further provides a parallel sensing touch control device and an operating method thereof that shorten the scanning interval using a parallel sensing technique so as to reduce the power consumption.

The present disclosure provides a parallel sensing touch control device configured to be coupled to a capacitive sensor array having a plurality of sensing electrodes. The parallel sensing touch control device includes a first multiplexer, a second multiplexer and a differential unit. The first multiplexer is configured to be controlled by a first selection signal to electrically connect to at least one of the plurality of sensing electrodes, and output a first detected signal. The second multiplexer is configured to be controlled by a second selection signal to electrically connect to at least one of the plurality of sensing electrodes, and output a second detected signal. The first multiplexer and the second multiplexer are configured to electrically connect to different sensing electrodes. In one detection interval, at least one of the first and second multiplexers is configured to electrically concurrently connect to more than one sensing electrode. The differential unit is coupled to the first and second multiplexers, and configured to perform a differential operation on the first and second detected signals to output a differential signal.

The present disclosure further provides an operating method of a parallel sensing touch control device. The parallel sensing touch control device includes a first multiplexer, a second multiplexer and a digital signal processor. The parallel sensing touch control device is coupled to a capacitive sensor array having a plurality of sensing electrodes. The operating method includes the steps of: entering a normal mode, in which the first multiplexer is electrically connected to one of the plurality of sensing electrodes and the second multiplexer is electrically connected to another one of the plurality of sensing electrodes in one detection interval of the normal mode; entering a low power mode when the digital signal processor identifies that there is no touch within a predetermined time interval; and electrically connecting the first multiplexer to more than one sensing electrode among the plurality of sensing electrodes, and electrically connecting the second multiplexer to more than one sensing electrode among the plurality of sensing electrodes in one detection interval of the low power mode, wherein the first and second multiplexers are electrically connect to a same number of different sensing electrodes.

The present disclosure further provides an operating method of a parallel sensing touch control device. The parallel sensing touch control device includes a first multiplexer, a second multiplexer and a digital signal processor. The parallel sensing touch control device is coupled to a capacitive sensor array having a plurality of sensing electrodes. The operating method includes the steps of: entering a low power mode, in which the first multiplexer is electrically connected to multiple first sensing electrodes among the plurality of sensing electrodes and the second multiplexer is electrically connected to multiple second sensing electrodes among the plurality of sensing electrodes in one detection interval, wherein the multiple first sensing electrodes and the multiple second sensing electrodes are different from each other but have an identical number; entering a normal mode when the digital signal processor identifies a touch; electrically connecting, in a first detection interval of the normal mode, the first multiplexer to multiple third sensing electrodes among the plurality of sensing electrodes and electrically connecting, in the first detection interval, the second multiplexer to at least one fourth sensing electrode among the plurality of sensing electrodes; and electrically connecting, in a second detection interval of the normal mode, the first multiplexer to multiple fifth sensing electrodes among the plurality of sensing electrodes and electrically connecting, in the second detection interval, the second multiplexer to at least one sixth sensing electrode among the plurality of sensing electrodes, wherein the multiple fifth sensing electrodes are identical to a part of the multiple third sensing electrodes, and the at least one sixth sensing electrode is identical to a part of or totally different from the at least one fourth sensing electrode.

In the parallel sensing touch control device of the present disclosure, a parallel sensing technique is adaptable to both a normal mode and a low power mode, wherein the normal mode is referred to, for example, a mode for detecting the touch position, and the low power mode is referred to, for example, a mode for detecting a touch event to confirm whether to return to the normal mode. By using the parallel sensing technique in the normal mode, the multi-touch detection is facilitated and the detection sensitivity is improved. By using the parallel sensing technique in the low power mode, the scanning interval is shortened so as to reduce the total power consumption.

In the present disclosure, a detection interval is referred to, for example, a time interval during which a predetermined number of sampling points of one detection cell are sampled. A scanning interval is referred to, for example, a time interval during which one scan of the capacitive sensor array is accomplished, wherein said one scan is not limited to detect all detection cells but referred to detect only a part of detection cells of the capacitive sensor array.

BRIEF DESCRIPTION OF THE DRAWINGS

Other objects, advantages, and novel features of the present disclosure will become more apparent from the following detailed description when taken in conjunction with the accompanying drawings.

FIG. 9 is an operational schematic diagram of a parallel sensing touch control device according to another embodiment of the present disclosure.

FIG. 11 is an operational schematic diagram of a parallel sensing touch control device according to an alternative embodiment of the present disclosure.

FIG. 16 is an operational schematic diagram of a parallel sensing touch control device according to another embodiment of the present disclosure.

DETAILED DESCRIPTION OF THE EMBODIMENT

It should be noted that, wherever possible, the same reference numbers will be used throughout the drawings to refer to the same or like parts.

Figure 1:
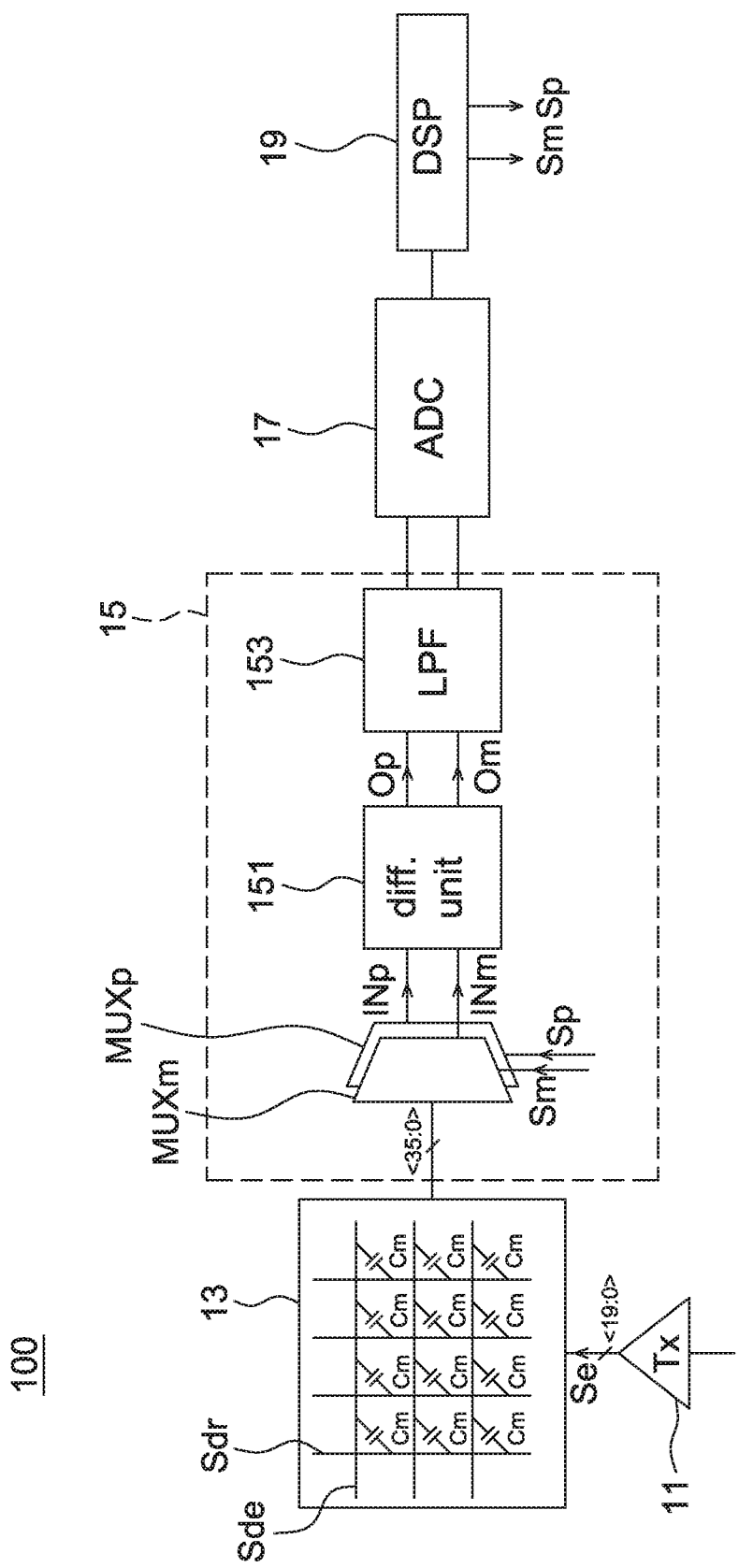
FIG. 1 is a block diagram of a parallel sensing touch control device according to one embodiment of the present disclosure.

Referring to FIG. 1, it is a block diagram of a parallel sensing touch control device 100 according to one embodiment of the present disclosure. The parallel sensing control touch device 100 includes drive circuits 11, an analog front end 15, an analog to digital converter (ADC) 17 and a digital signal processor (DSP) 19. The parallel sensing control touch device 100 is electrically coupled to a capacitive sensor array 13.

The capacitive sensor array 13 has a plurality of drive electrodes (e.g., 20 electrodes being shown in FIG. 1) Sdr and a plurality of sensing electrodes (e.g., 36 electrodes being shown in FIG. 1) to form mutual capacitors Cm, wherein the method of a capacitive sensor array 13 detecting an external conductor through mutual capacitance is known to the art, and thus details thereof are not described herein. In addition, although a mutual capacitive sensor array is taken as an example herein, the present disclosure is not limited thereto. The capacitive sensor array 13 is a self-capacitive sensor array in other embodiments.

The drive circuit 11 is, for example, a signal generator and used to generate a continuous or non-continuous rectangular wave, sinusoidal wave or a signal of other waveforms to the capacitive sensor array 13. It should be mentioned that FIG. 1 shows only one drive circuit 11 for simplification purposes, but the parallel sensing touch control device 100 includes a plurality of drive circuits 11 respectively coupled to the plurality of drive electrodes Sdr of the capacitive sensor array 13. The plurality of drive circuits 11 generates a drive signal Se with an excitation frequency to drive the capacitive sensor array 13. After the drive signal Se passes the drive electrodes Sdr and the mutual capacitors Cm, a detected signal is outputted via the sensing electrodes Sde to the analog front end 15.

The present disclosure is using parallel sensing method to sense more than one sense electrode together to shorten a total sense time or scan time. In one embodiment, the analog front end 15 uses multiplexers to sense more than one sense electrode together. The analog front end 15 includes a first multiplexer MUXm, a second multiplexer MUXp, a differential unit (diff. unit) 151 and a low pass filter (LPF) 153. For example referring to FIG. 2, it is a schematic diagram of the first multiplexer MUXm and the second multiplexer MUXp. When an arbitrary one conducting path is electrically connected to the corresponding sensing electrode at row <0> to row <35>, a detected signal on an input terminal of the multiplexer is conducted to an output terminal of the multiplexer to be outputted to the differential unit 151. In the present disclosure, the first multiplexer MUXm and the second multiplexer MUXp are used to be electrically connected to all of the sensing electrodes Sde. Each of the sensing electrodes Sde is preferably coupled to the two multiplexers MUXm and MUXp, and whether the each of the sensing electrodes Sde is conducted is determined according to a selection signal Sm/Sp.

Figure 2:
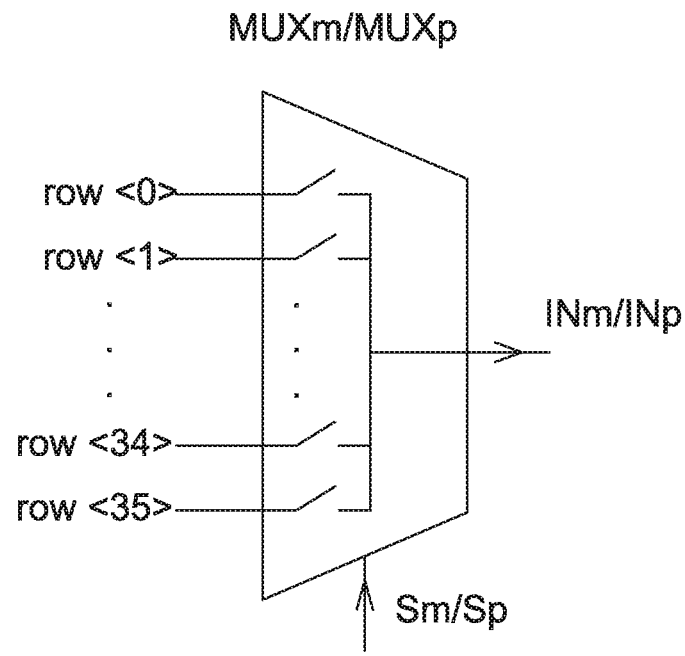
FIG. 2 is a schematic diagram of a multiplexer of a parallel sensing touch control device according to one embodiment of the present disclosure.

The first multiplexer MUXm is an analog multiplexer which is controlled by a first selection signal Sm to electrically connect to at least one of the plurality of sensing electrodes Sde (e.g., FIG. 2 showing one of row <0> to row <35>) of the capacitive sensor array 13 to output a first detected signal INm, which indicates a voltage change of the connected sensing electrode(s), to the differential unit 151. That is, the first detected signal INm reflects a voltage change on one sensing electrode or a sung/average of voltage changes on multiple sensing electrodes according to a connection state of the first multiplexer MUXm.

Similarly, the second multiplexer MUXp is an analog multiplexer which is controlled by a second selection signal Sp to electrically connect to at least one of the plurality of sensing electrodes Sde (e.g., FIG. 2 showing one of row <0> to row <35>) of the capacitive sensor array 13 to output a second detected signal INp, which indicates a voltage change of the connected sensing electrode(s), to the differential unit 151. That is, the second detected signal INp reflects a voltage change on one sensing electrode or a sum of voltage changes on multiple sensing electrodes according to a connection state of the second multiplexer MUXp.

Within a same time interval, the first multiplexer MUXm and the second multiplexer MUXp are not connected to the same sensing electrode(s).

The differential unit 151 is electrically coupled to output terminals of the first multiplexer MUXm and the second multiplexer MUXp to receive the first detected signal INm and the second detected signal INp, and performs a differential operation on the first detected signal INm and the second detected signal INp to output differential signals Om and Op. According to different connections, the differential operation is calculated by subtracting the first detected signal INm from the second detected signal INp, or vice versa.

Figure 3:
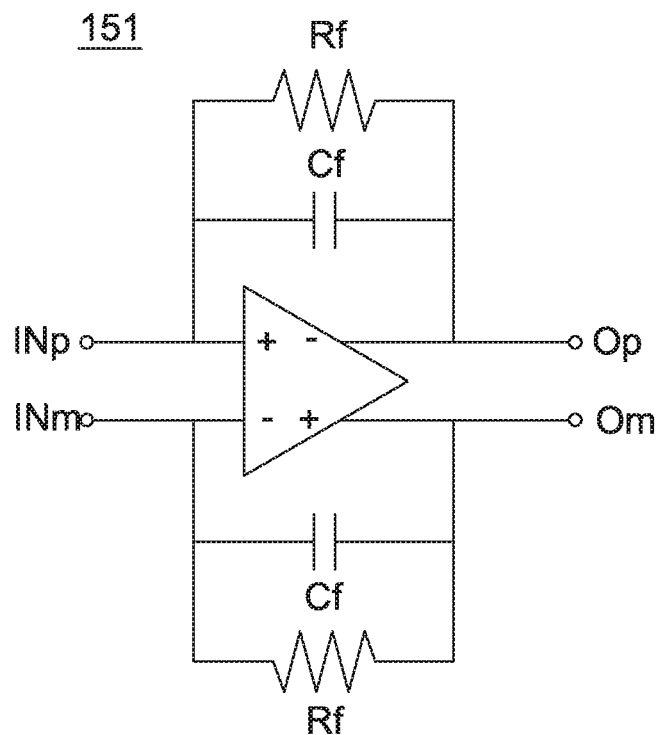
FIG. 3 is a circuit diagram of a differential charge amplifier of a parallel sensing touch control device according to one embodiment of the present disclosure.

In a non-limiting embodiment, the differential unit 151 includes, for example, a differential charge amplifier as shown in FIG. 3. An output terminal of the first multiplexer MUXm is coupled to a first input terminal (FIG. 3 showing the inverting input) of the differential charge amplifier, and an output terminal of the second multiplexer MUXp is coupled to a second input terminal (FIG. 3 showing the noninverting input) of the differential charge amplifier, or vice versa. For example, the differential charge amplifier forms a high pass filter to allow high frequency components to pass through the mutual capacitor Cm, but not limited thereto. It is possible that the differential charge amplifier is formed by a bandpass filter or other charge amplifiers. The differential charge amplifier includes feedback capacitors Cf and feedback resistors Rf connecting between input terminals and output terminals.

Figure 4:
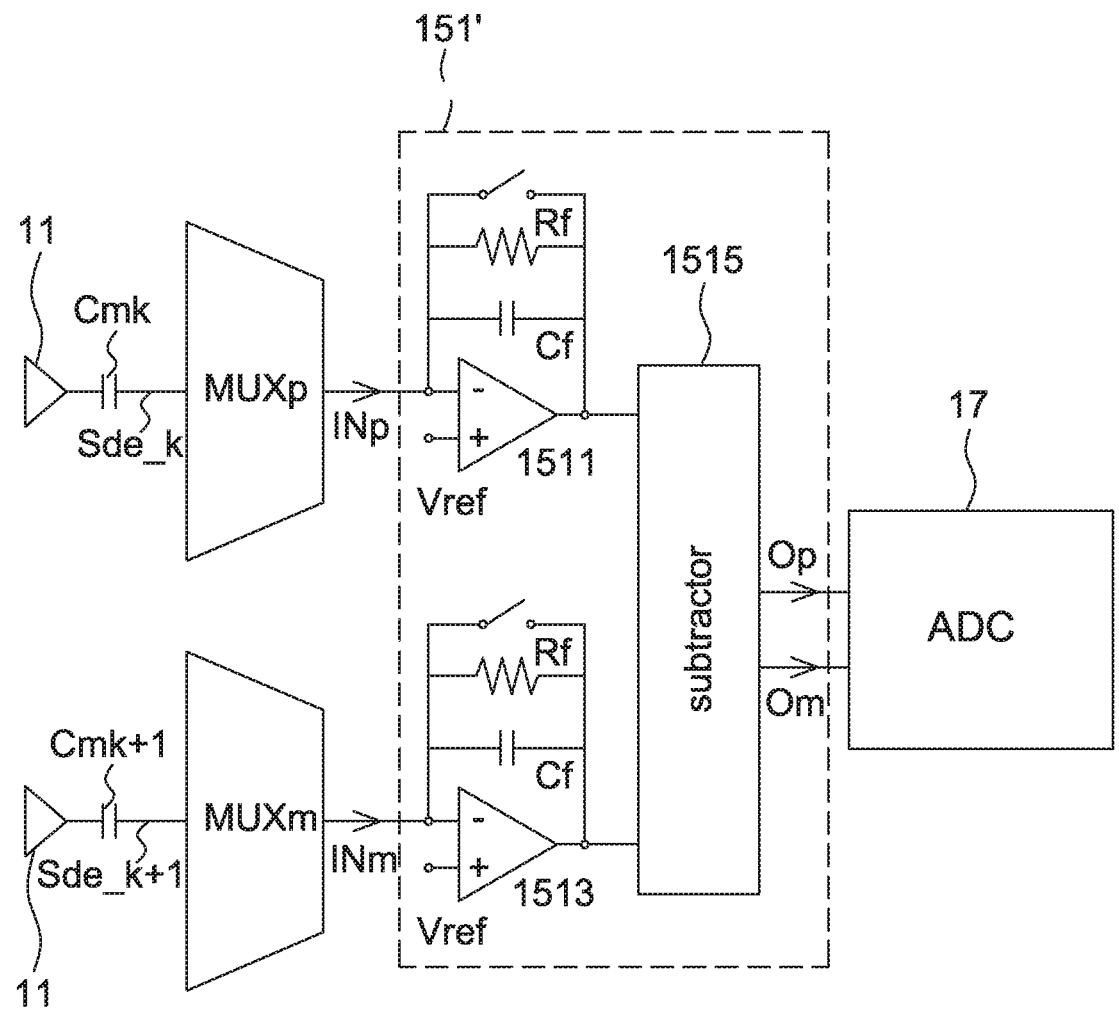
FIG. 4 is a block schematic diagram of an analog front end of a parallel sensing touch control device according to another embodiment of the present disclosure.

In a non-limiting embodiment, the differential unit 151' includes, for example, a first single-ended amplifier 1511, a second single-ended amplifier 1513 and a subtractor 1515, as shown in FIG. 4. An output terminal of the first multiplexer MUXm is coupled to one input terminal of the first single-ended amplifier 1511 (e.g., FIG. 4 showing connecting to the inverting input). An output terminal of the second multiplexer MUXp is coupled to one input terminal of the second single-ended amplifier 1513 (e.g., FIG. 4 showing connecting to the inverting input). The noninverting inputs of the first single-ended amplifier 1511 and the second single-ended amplifier 1513 are connected to a reference voltage Vref. The subtractor 1515 is connected to output terminals of the first single-ended amplifier 1511 and the second single-ended amplifier 1513, and used to perform a differential operation on detected signals outputted by the first single-ended amplifier 1511 and the second single-ended amplifier 1513 to cancel common-mode noise. It is possible to arrange a low pass filter between the differential unit 151' and the ADC 17 in FIG. 4 to block unwanted signals. According to different connections between the multiplexer and the single-ended amplifier, the subtractor 151 is replaced by an adder if different drive signals could be provided with different polarities at the same time.

Comparing with using the single-ended amplifiers in the differential unit 151, using the differential charge amplifier has benefits of avoiding signal saturation, adopting a smaller feedback capacitor Cf and eliminating the mismatch between two single-ended amplifiers.

The analog front end 15 further includes a low pass filter to filter the differential signals Op and Om outputted from the differential unit 151 to block signals and noises outside the operation frequency.

The parallel sensing touch control device 100 further includes an analog to digital converter (ADC) 17, which is coupled downstream of the analog front end 15, used to convert the filtered differential signals Op and Om to a digital signal. The ADC 17 uses a suitable conventional analog to digital converter.

The parallel sensing touch control device 100 further includes a digital signal processor (DSP) 19, which is coupled downstream of the ADC 17, used to identify a touch according to the digital signal, e.g., comparing the digital signal with a predetermined voltage threshold to identify a touch position (described by examples below) or identify a touch event according to a voltage change of the digital signal. The DSP 19 determines whether to enter a normal mode or a low power mode according to the occurrence of a touch event (described by an example below). The DSP 19 also generates the first selection signal Sm and the second selection signal Sp to control the connection state of the first multiplexer MUXm and the second multiplexer MUXp.

In a non-limiting embodiment, the above mentioned drive circuit 11, analog front end 15, ADC 17 and DSP 19 form a control chip, which connects to the capacitive sensor array 13 via a bus line and/or signal lines. The control chip is arranged inside the capacitive sensor array 13 or in an external device which coupled to the capacitive sensor array 13.

The parallel sensing touch control device 100 of the present disclosure is operated in a normal mode or a low power mode (or sleep mode). The normal triode is referred to a mode for recognizing one or multiple touch positions on the capacitive sensor array 13.

To avoid power consumption or when no touch event is detected with a predetermined time interval under the normal mode, the low power mode is entered. Said no touch event being detected is referred to that all detection cells of the capacitive sensor array 13 do not generate enough capacitance variations (e.g., larger than a predetermined value). The low power mode is referred to a mode for detecting a touch event which is used to confirm whether the normal triode should be returned. Non-limiting embodiments are used below to illustrate operations of the normal mode and low power mode.

Figures 5, 6:
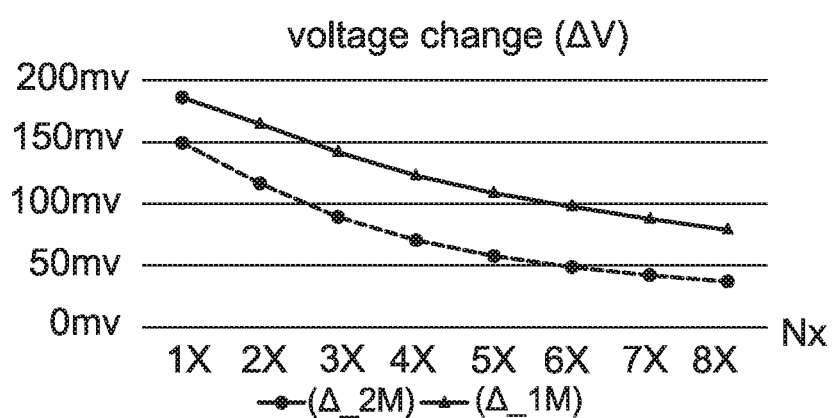
FIG. 5 is an operational schematic diagram of a parallel sensing touch control device according to one embodiment of the present disclosure.
FIG. 6 is a schematic diagram showing a relationship between the voltage change and parallel numbers as well as excitation frequencies of a parallel sensing touch control device according to one embodiment of the present disclosure.

Referring to FIG. 5, it is an operational schematic diagram of a parallel sensing touch control device 100 according to one embodiment of the present disclosure. FIG. 5 shows that one scan is accomplished after five detection intervals T0-T4. That is, each scanning interval includes five detection intervals in this embodiment, wherein each detection interval is referred to a time interval during which a predetermined number of sampling points of one detection cell are sampled, and the detection cell is referred to one mutual capacitor Cm, which is formed by one drive electrode Sdr and one sensing electrode Sde in a mutual capacitive sensor array. Each detection interval corresponds to one connection state of the first and second multiplexers MUXm and MUXp.

For example in FIG. 5, the term "INm" is referred to that the row of sensing electrode Sde is electrically connected to the first multiplexer MUXm, the term "INp" is referred to that the row of sensing electrode Sde is electrically connected to the second multiplexer MUXp, and the term "X" is referred to that the row of sensing electrode Sde is not electrically connected to the first multiplexer MUXm or the second multiplexer MUXp. Only a voltage change on the sensing electrode Sde which is electrically connected to the first multiplexer MUXm or the second multiplexer MUXp is outputted.

In a non-limiting embodiment, the first multiplexer MUXm and the second multiplexer MUXp are both electrically connected to more than one sensing electrodes Sde, and numbers (i.e. a parallel number Nx mentioned below) of sensing electrodes electrically connected to the first multiplexer MUXm and the second multiplexer MUXp are identical.

For example in FIG. 5, the first multiplexer MUXm and the second multiplexer MUXp are electrically connected to a first group of sensing electrodes, which includes sensing electrodes Sde at row 0 to row 5, respectively according to a first selection signal Sm and a second selection signal Sp in a first detection interval T0. The first multiplexer MUXm and the second multiplexer MUXp are electrically connected to a second group of sensing electrodes, which includes sensing electrodes Sde at row 3 to row 8, in a second detection interval T1. In the second detection interval T1, the sensing electrodes (e.g., sensing electrodes Sde at row 3 to row 5) electrically connected to the first multiplexer MUXm are identical to those (e.g., sensing electrodes Sde at row 3 to row 5) electrically connected to the second multiplexer MUXp in the first detection interval T0 but different from those (e.g., sensing electrodes Sde at row 0 to row 2) connected to the first multiplexer MUXm in the first detection interval T0. It is shown in FIG. 5 the connection of the first multiplexer MUXm and the second multiplexer MUXp with the plurality of sensing electrodes Sde of the capacitive sensor array 13 from the third detection interval T2 to the fifth detection interval T4. In the present disclosure, within one scanning interval, the first multiplexer MUXm and the second multiplexer MUXp are sequentially connected to all sensing electrodes Sde respectively according to the first selection signal Sm and the second selection signal Sp.

In an embodiment that all detection cells are not scanned within one scanning interval, the first multiplexer MUXm and the second multiplexer MUXp are sequentially connected to all predetermined sensing electrodes Sde to be scanned respectively according to the first selection signal Sm and the second electrode signal Sp within the one scanning interval.

FIG. 5 shows that the first multiplexer MUXm and the second multiplexer MUXp are both connected to 3 sensing electrodes Sde in each of the detection intervals T0-T4. Compared with the conventional method that needs 17 detection intervals to accomplish the detection within each scanning interval, only 5 detection intervals are required to accomplish the detection in FIG. 5 such that the scanning interval is significantly shortened to reduce the power consumption, and thus it is referred to a low power mode. Meanwhile, a number of sampling points in each detection interval is not necessary to be reduced to maintain the SNR.

However, when a number of parallel sensing (e.g., indicated by parallel number Nx) is higher, a voltage change ΔV between touched signal and non-touch signal is still decreased. For example referring to FIG. 6, it shows a schematic diagram of the relationship between the voltage change and the parallel number Nx under two different excitation frequencies (e.g., 1 MHz and 2 MHz) of the drive signal Se. It is clear that when the parallel number Nx becomes higher, the voltage change ΔV becomes lower, which can reduce the recognition resolution. It is seen from FIG. 5 that if a higher parallel number Nx is used, the voltage change ΔV is recovered by lowering the excitation frequency. In the present disclosure, a maximum value of sensing electrodes Sde (i.e. Nx) concurrently connected to the first multiplexer MUXm and the second multiplexer MUXp respectively is a half of a number of the plurality of sensing electrodes Sde of the capacitive sensor array 13, and a minimum value is 2.

In addition to the above merits, the parallel sensing of FIG. 5 improves a magnitude of the voltage change ΔV between the touched signal and non-touch signal when a large touch area exists. For example referring to FIG. 7, it shows the fourth drive electrode (indicated by Tx<3> herein) to the sixth drive electrode (indicated by Tx<5> herein) and the seventh sensing electrode (indicated by Sense<6> herein) to the eleventh sensing electrode (indicated by Sense<10> herein). For illustration purposes, it is assumed that a touch point center is at a location of the detection cell (Tx<4>, Sense<7>) to cause a 200 fF (femto farads) capacitance decrement. Meanwhile, as the touch area is larger, detection cells around the touch point center also have the capacitance decrement of 100 fF. The detection cells not indicated by a capacitance value in FIG. 7 is referred to no capacitance (of the mutual capacitor Cm) change occurring.

Figure 7:
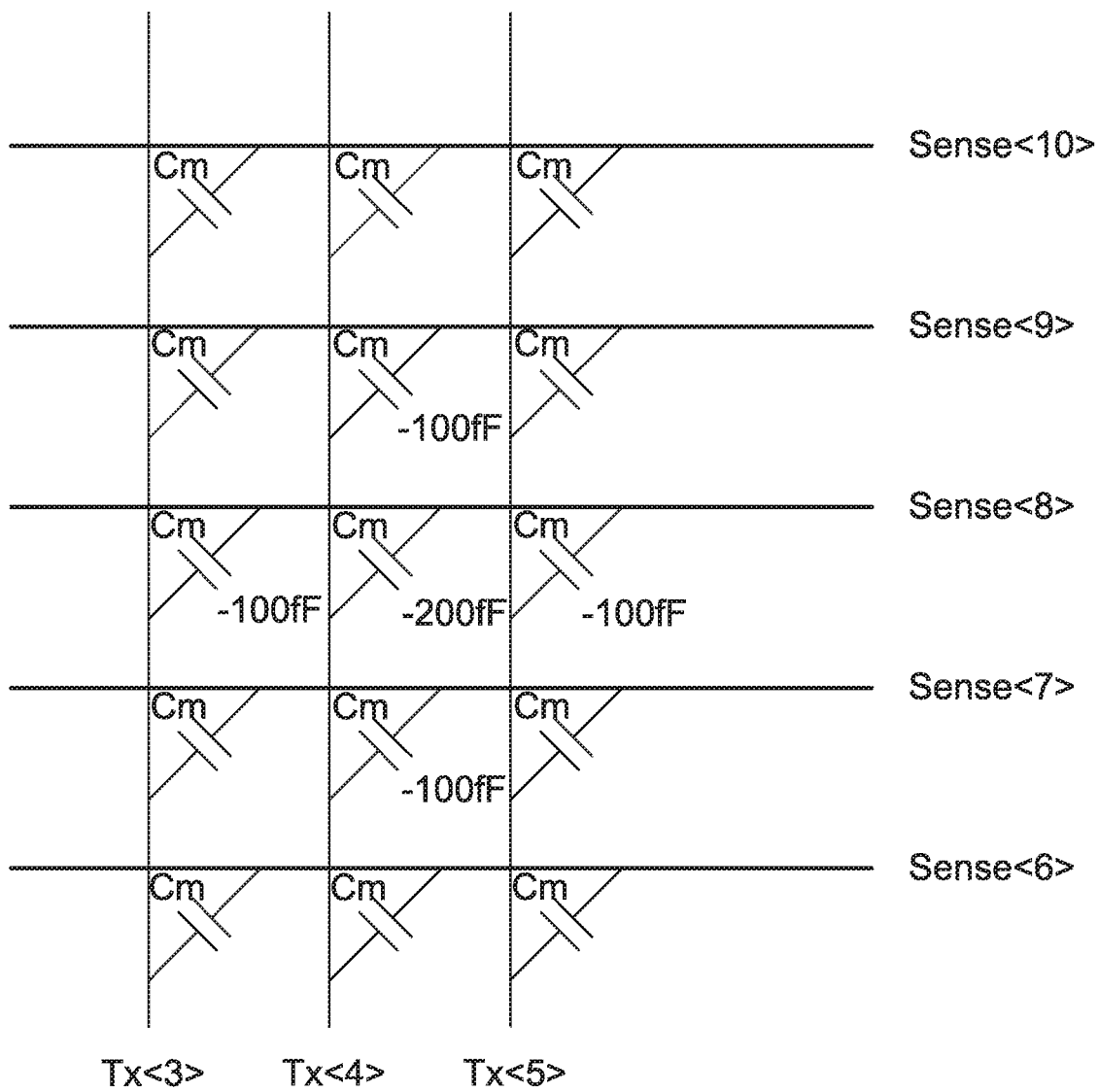
FIG. 7 is a schematic diagram showing capacitance variations of a capacitive sensor array of a parallel sensing touch control device according to one embodiment of the present disclosure.
Figure 8:
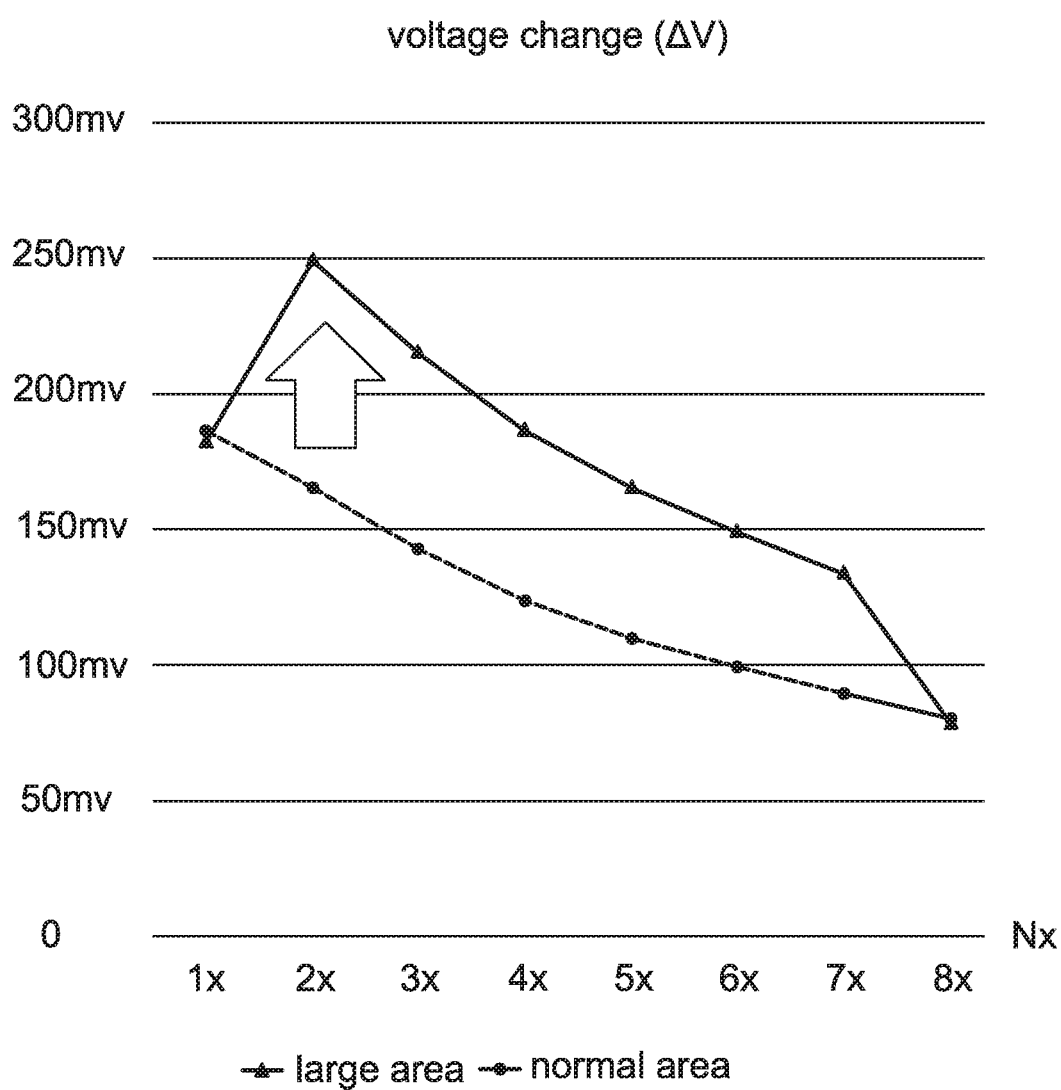
FIG. 8 is a schematic diagram showing the voltage change of different touch areas with respect to different parallel numbers.

Referring to FIG. 8, it is a detection result of a normal touch area, e.g., only the detection cell (Tx<4>, Sense<7>) detecting a touch, and a large touch area, e.g., 5 detection cells shown in FIG. 7 detecting a touch, detected by the parallel sensing technique shown in FIG. 5. It is clear that when the Nx=2-7, voltage changes associated with the large touch area are larger than those associated with the normal touch area. FIGS. 7 and 8 show one advantage of the parallel sensing technique of the present disclosure.

Referring to FIG. 9, it is an operational schematic diagram of a parallel sensing touch control device 100 according to another embodiment of the present disclosure, which is adaptable to a multi-touch detection in a normal mode. FIG. 9 shows that one scan is accomplished after 13 detection intervals T0-T12. That is, each scanning interval includes 13 detection intervals, wherein definitions of the detection interval and scanning interval are described above. In FIG. 9, definitions of the terms "INm", "INp" and "X" have been mentioned above, and thus details thereof are not repeated again.

For example in FIG. 9, the parallel number Nx is selected as 2. In a first detection interval T0, the first multiplexer MUXm and the second multiplexer MUXp are electrically connected to a first group of sensing electrodes, which includes sensing electrodes Sde from row 0 to row 3. In a second detection interval T1, the first multiplexer MUXm and the second multiplexer MUXp are electrically connected to a second group of sensing electrodes, which includes sensing electrodes Sde from row 1 to row 4. In the second detection interval T1, the sensing electrodes (e.g., sensing electrodes Sde from row 1 to row 2) electrically connected to the first multiplexer MUXm are identical to a part of the sensing electrodes (e.g., sensing electrode Sde at row 2) electrically connected to the second multiplexer MUXp in the first detection interval T0 and identical to a part of the sensing electrodes (e.g., sensing electrode Sde at row 1) electrically connected to the first multiplexer MUXm in the first detection interval T0. It is also seen from FIG. 9 the connection of the first multiplexer MUXm and the second multiplexer MUXp with respect to the plurality of sensing electrodes Sde of the capacitive sensor array 13 in the third detection interval T2 to the thirteenth detection interval T12. The first multiplexer MUXm and the second multiplexer MUXp also sequentially connected to all sensing electrodes Sde within one scanning interval respectively according to the first selection signal Sin and the second selection signal Sp.

FIG. 9 shows that the first multiplexer MUXm and the second multiplexer MUXp are concurrently connected to 2 sensing electrodes Sde, respectively, in every detection interval T0-T12. In this embodiment, the scanning interval is not shortened, and the parallel sensing is adapted to detect a multi touch in a normal mode. For example, FIG. 10 is a schematic diagram of a detection result, based on the operation of FIG. 9, regarding two touch points at the sensing electrodes <7> and <8> and the sensing electrodes <6> and <7>, which is obtained by the DSP 19 using the digital signal.

Figure 10:
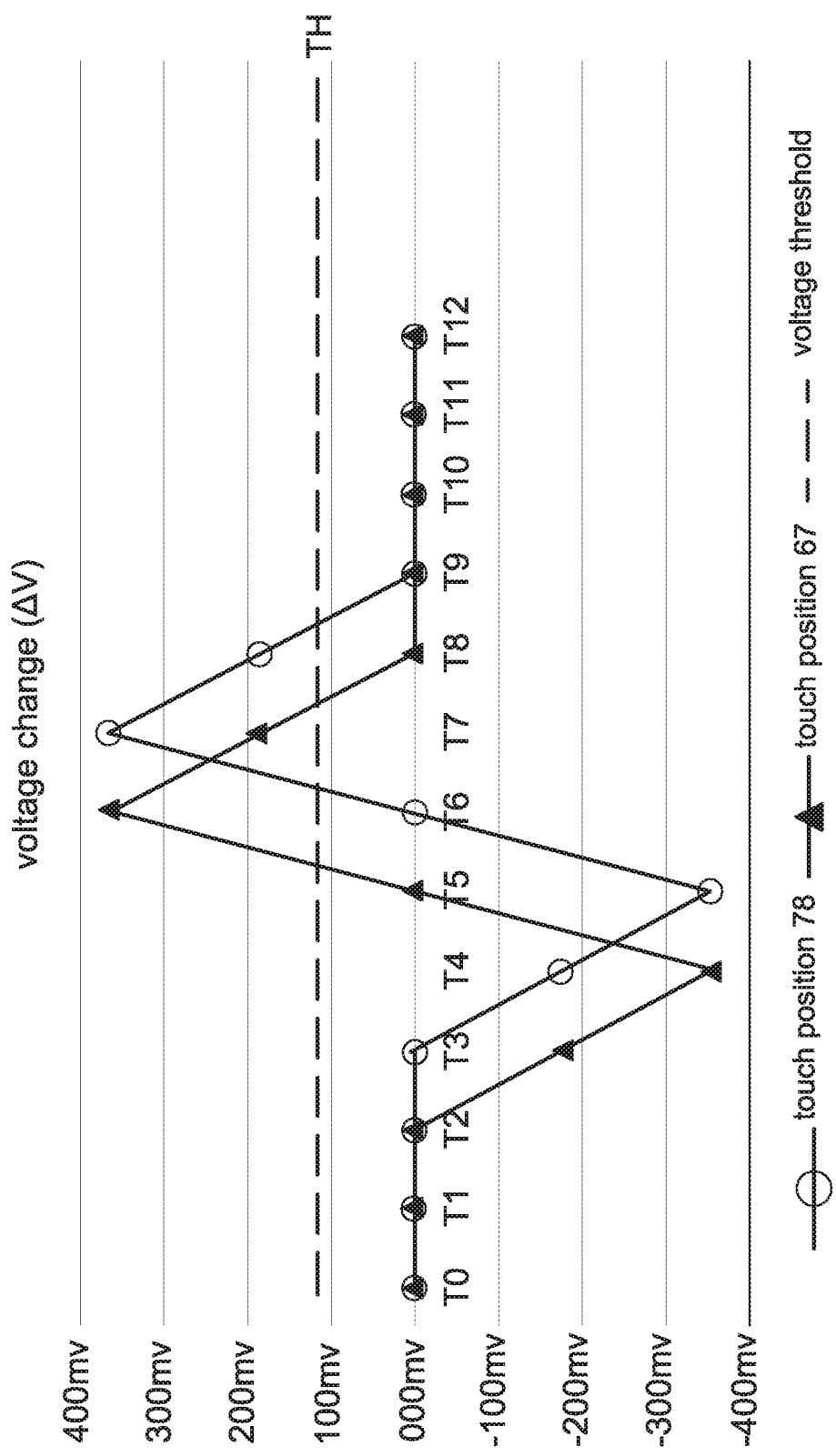
FIG. 10 is a schematic diagram showing the voltage change corresponding to the operation of FIG. 9.

FIG. 10 is illustrated herein by taking the two touch points at the sensing electrodes <6> and <7> as an example (e.g., variation shown by solid triangles). In the detection intervals T0-T2, as there is no capacitance change on sensing electrodes <0> to <5>, the voltage change ΔV after the differential operation is 0. When the detection interval T3 is entered, the second multiplexer MUXp is connected to the sensing electrode <6>, which has a capacitance decrement due to the touch to cause the voltage change ΔV to be smaller than 0 after the differential operation (e.g., INp-INm). When the detection interval T4 is entered, the second multiplexer MUXp is connected to the sensing electrodes <6> and <7>, which have a higher capacitance decrement due to the touch (e.g., referring to FIG. 7), and thus a higher voltage change ΔV is obtained in the detection interval T4. When the detection interval T5 is entered, the first multiplexer MUXm is connected to the sensing electrode <6> and the second multiplexer MUXp is connected to the sensing electrodes <7>, and the differential operation cancels out the voltage change ΔV. When the detection interval T6 is entered, the first multiplexer MUXm is connected to the sensing electrodes <6> and <7>, and the differential operation causes the voltage change ΔV to become larger than 0. When the detection interval T7 is entered, the first multiplexer MUXm is connected to the sensing electrode <7>, and the differential operation causes the voltage change ΔV still be larger than 0. In detection intervals T8-T12, as there is no capacitance change on sensing electrodes <8> to <15>, the voltage change ΔV after the differential operation is 0. Detection intervals corresponding to the voltage change ΔV larger than a voltage threshold TH are used to indicate a touch location.

It is clear from FIG. 10 that voltage changes ΔV larger than the voltage threshold TH are respectively obtained in detection intervals T6 and T'7 (represented by solid triangles) such that two touch points are obtainable. The relationship between the detection interval having a voltage change larger than the voltage threshold TH with respect to the touch position (or coordinate) is previously coded and stored in a memory of the parallel sensing touch control device 100. The DSP 19 recognizes the touch position by checking said pre-stored relationship. In addition, in order to effectively distinguish touch points, a proper voltage threshold TH is selected, and a value of the voltage threshold TH is larger than 0, which is preset and recorded in the memory before shipment. The voltage threshold TH is set by dynamically or by a series of machine training. The variation shown by empty circles in FIG. 10 is a case that two touch points are at sensing electrodes <7> and <8>.

In a non-limiting embodiment, within each detection interval, the first multiplexer MUXm is electrically connected to more than on sensing electrode Sde, and the second multiplexer MUXp is electrically connected to one sensing electrode Sde. This embodiment performs the imbalance parallel sensing for improving the SNR and multi touch detection.

For example referring to FIG. 11, the first multiplexer MUXm and the second multiplexer MUXp are electrically connected to a same group of sensing electrodes (e.g., FIG. 11 showing sensing electrodes Sde from row 0 to row 3) in the first detection interval T0 to the fourth detection interval T3. The second multiplexer MUXp is electrically connected to different sensing electrodes among the same group of sensing electrodes in the first detection interval T0 to the fourth detection interval T3, e.g., connected to the sensing electrode at row 0 in the first detection interval T0, connected to the sensing electrode at row 1 in the second detection interval T1, connected to the sensing electrode at row 2 in the third detection interval T2 and connected to the sensing electrode at row 3 in the fourth detection interval T3. The connection between the first multiplexer MUXm and the second multiplexer MUXp with respect to the plurality of sensing electrodes Sde of the capacitive sensor array 13 from the fifth detection interval T4 to the sixteenth detection interval T15 is shown in FIG. 11. In this embodiment, the first multiplexer MUXm and the second multiplexer MUXp are also sequentially connected to all sensing electrodes Sde respectively according to the first selection signal Sm and the second selection signal Sp.

Figure 12:
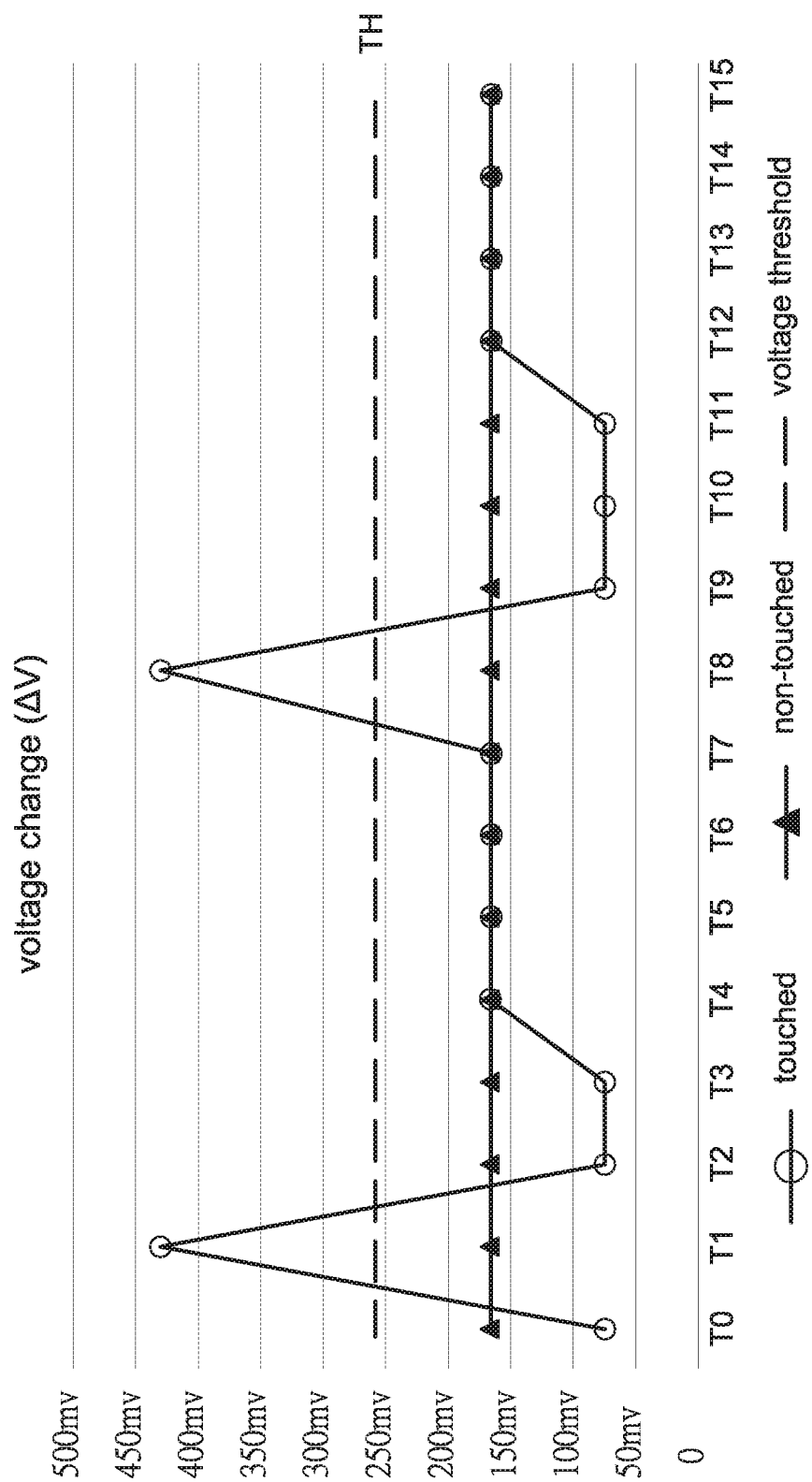
FIGS. 12-13 are schematic diagrams showing the voltage change corresponding to the operation of FIG. 11.

FIG. 12 is a schematic diagram of a detection result showing two touch points at sensing electrodes <1> and <8>, respectively, which is obtained by the DSP 19 according to the digital signal. It is seen from FIG. 12 that a maximum voltage change ΔV is obtained respectively in detection intervals T1 and T8 such that two touch points are obtained. Similarly, the relationship between the detection interval having a maximum voltage change with respect to the touch position for coordinate) is previously coded and stored in a memory. Multiple touch points are also distinguishable by selecting a proper voltage threshold TH.

Figure 13:
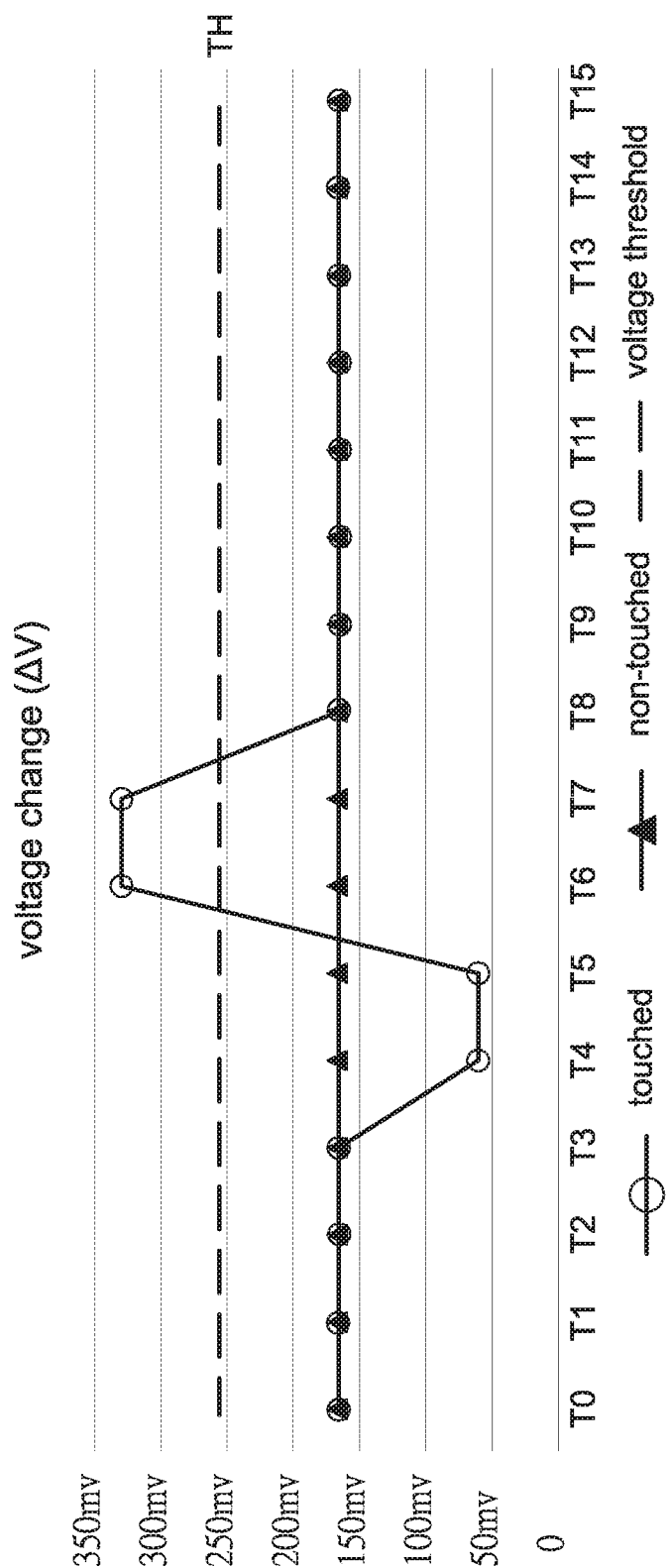

For example, FIG. 13 is a schematic diagram of a detection result showing two touch points at sensing electrodes <6> and <7>, respectively. A maximum voltage change ΔV is obtained respectively in detection intervals T6 and T7, but two different touch positions are not distinguishable by selecting the voltage threshold TH. A large touch area is obtained than FIG. 12 in this embodiment. In this embodiment, different touch points are distinguished by incorporating other methods. The calculation of FIGS. 12 and 13 is similar to FIG. 10, and a person skill in the art would understand the calculation of FIGS. 12 and 13 after understanding the calculation of FIG. 10.

Figure 14:
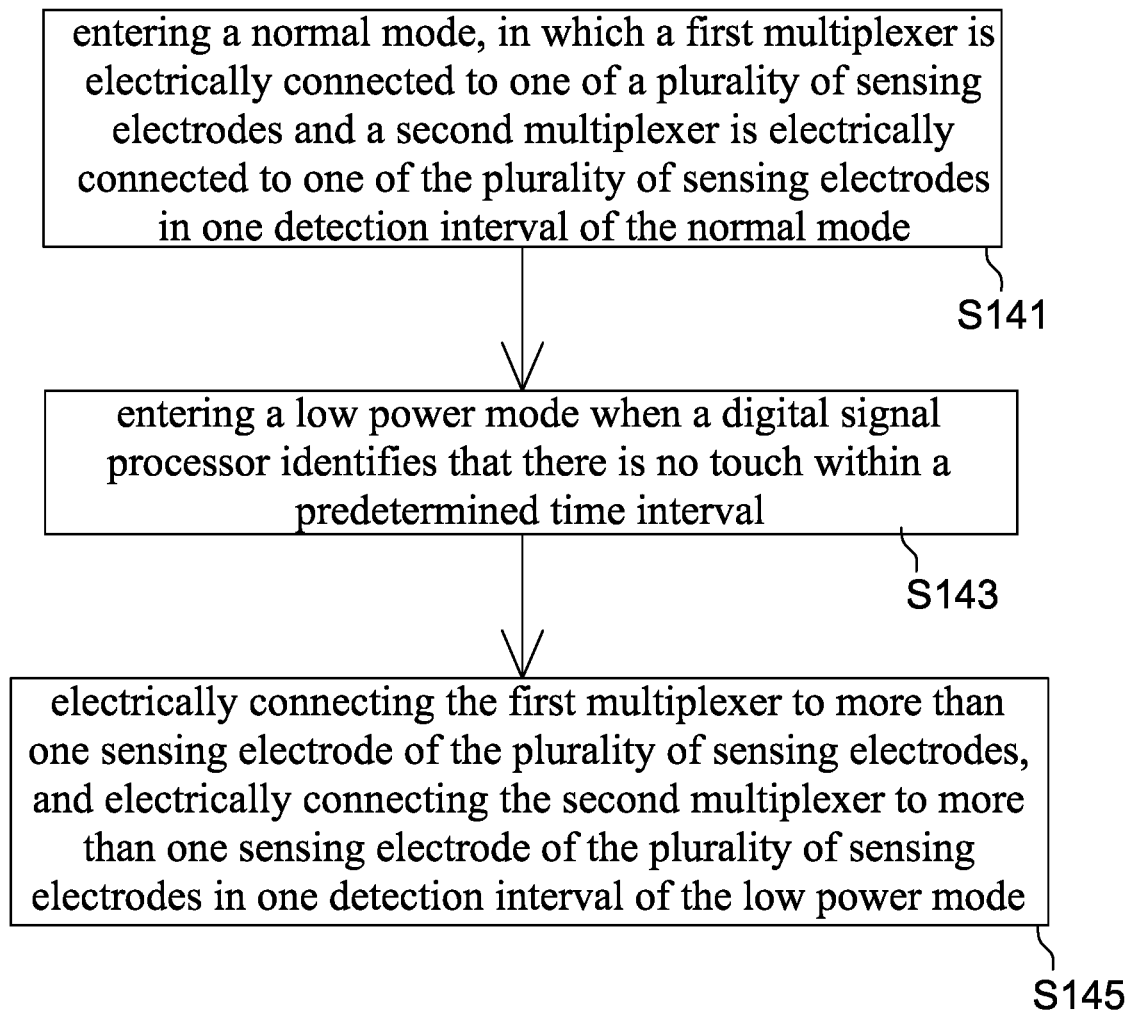
FIG. 14 is a flow chart of a parallel sensing touch control device according to one embodiment of the present disclosure.

Referring to FIG. 14, it is a flow chart of a parallel sensing touch control device 100 according to one embodiment of the present disclose, including the steps of: entering a normal mode, in which a first multiplexer is electrically connected to one of a plurality of sensing electrodes and a second multiplexer is electrically connected to one of the plurality of sensing electrodes in one detection interval of the normal mode (Step S141); entering a low power mode when a digital signal processor identifies that there is no touch within a predetermined time interval (Step S143); and electrically connecting the first multiplexer to more than one sensing electrode of the plurality of sensing electrodes, and electrically connecting the second multiplexer to more than one sensing electrode of the plurality of sensing electrodes in one detection interval of the low power mode, wherein the first and second multiplexers are electrically connect to a same number of different sensing electrodes (Step S145).

Step S141: It is assumed that the parallel sensing touch control device 100 automatically enters a normal mode when the operation is started, e.g., power on a mobile electronic device or ending a sleep mode. As mentioned above, in the normal mode the parallel sensing touch control device 100 is used to identify the touch position (or touch coordinate). In this embodiment, the parallel sensing touch control device 100 select a parallel number Nx=1 to perform the differential detection. For example, in a first detection interval, the first multiplexer MUXm is electrically connected to the sensing electrode <0> and the second multiplexer MUXp is electrically connected to the sensing electrode <1>; next, in a second detection interval, the first multiplexer MUXm is electrically connected to the sensing electrode <1> and the second multiplexer MUXp is electrically connected to the sensing electrode <2>; and the operation is performed in this sequence till all the sensing electrodes Sde are sequentially conducted by the first multiplexer MUXm and the second multiplexer MUXp to output detected signals INm and INp to accomplish the detection of one frame. The detected signals INm and INp are performed with differential operation by the differential unit 151, filtered by the low pass filter 153 and converted to digital signals by the ADC 17. Finally, the DSP 19 identifies the touch position according to the digital signal, e.g., according to the voltage change larger than a predetermined voltage threshold or according to a peak of the voltage change.

Step S143: The parallel sensing touch control device 100 repeats the Step S141 at a scanning frequency to identify the touch position. When there is no touch event occurs within a predetermined time interval, the DSP 19 identifies that a low power mode is entered to save power.

Step S145: After the low power mode is entered, the parallel sensing touch control device 100 electrically connects, in every detection interval, the first multiplexer MUXm and the second multiplexer MUXp to multiple sensing electrodes Sde respectively till all the sensing electrodes Sde are detected. For example in FIG. 5, the first multiplexer MUXm and the second multiplexer MUXp are electrically connected to 3 different sensing electrodes (i.e. Nx=3) respectively in every detection interval T0-T4. After 5 detection intervals, one scanning interval is accomplished. A length of the detection intervals T0-T4 is determined according to a number of the sampling points and excitation frequency.

As mentioned above, when the parallel number Xn is selected higher, one scan can be accomplished within a shorter time interval. Accordingly, to improve the power saving efficiency, in the low power mode the parallel sensing touch control device 100 further connects, in a first scanning interval, the first multiplexer MUXm and the second multiplexer MUXp to a first number of sensing electrodes, respectively, and connects, in a second scanning interval which is next to the first scanning interval, the first multiplexer MUXm and the second multiplexer MUXp to a second number of sensing electrodes, respectively, wherein the first number is larger than the second number. For example, a large first number is selected in the first scan, and a maximum value of the first number is a half of a number of the plurality of sensing electrodes Sde of the capacitive sensor array 13. A small second number is selected in a second scan, and a minimum value of the second number is 2. In addition, it should be mentioned that although two Nx is used to describe the present disclosure, it is not to limit the present disclosure. It is possible that the parallel sensing touch control device 100 uses more than two parallel numbers Nx to detect the touch event in different scanning intervals.

As shown in FIG. 6, when the parallel number Nx is selected larger, the detection sensitivity becomes lower. Therefore, in order to improve the detection sensitivity, the drive circuit 11 is controlled to drive the capacitive sensor array 13 with different excitation frequencies corresponding to different parallel numbers Nx. For example, in the low power mode, the parallel sensing touch control device 100 drives the capacitive sensor array 13 with a first excitation frequency in a first scanning interval, and the capacitive sensor array 13 is driven by a second excitation frequency in a second scanning interval, wherein the first excitation frequency is smaller than the second excitation frequency. The first excitation frequency and the second excitation frequency are selected corresponding to the first number and the second number to allow substantially identical detection sensitivity to be maintained in the first scanning interval and the second scanning interval.

Figure 15:
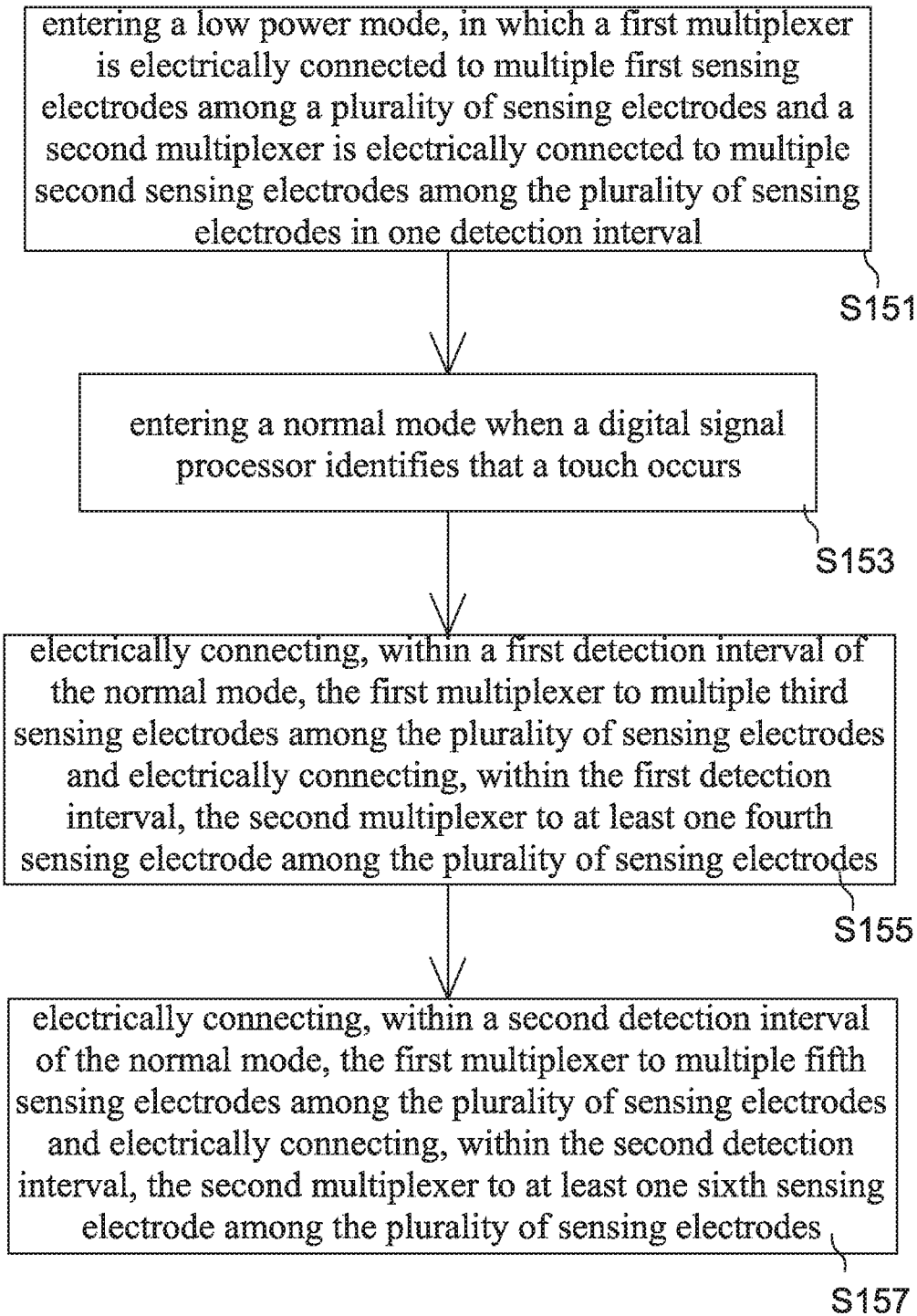
FIG. 15 is a flow chart of a parallel sensing touch control device according to another embodiment of the present disclosure.

Referring to FIG. 15, it is a flow chart of a parallel sensing touch control device 100 according to an alternative embodiment of the present disclose, including the steps of: entering a low power mode, in which a first multiplexer is electrically connected to multiple first sensing electrodes among a plurality of sensing electrodes and a second multiplexer is electrically connected to multiple second sensing electrodes among the plurality of sensing electrodes in one detection interval, wherein the multiple first sensing electrodes and the multiple second sensing electrodes are different from each other but have an identical number (Step S151); entering a normal mode when a digital signal processor identifies that a touch occurs (Step S153); electrically connecting, within a first detection interval of the normal mode, the first multiplexer to multiple third sensing electrodes among the plurality of sensing electrodes and electrically connecting, within the first detection interval, the second multiplexer to at least one fourth sensing electrode among the plurality of sensing electrodes (Step S155); and electrically connecting, within a second detection interval of the normal mode, the first multiplexer to multiple fifth sensing electrodes among the plurality of sensing electrodes and electrically connecting, within the second detection interval, the second multiplexer to at least one sixth sensing electrode among the plurality of sensing electrodes (Step S157), wherein the multiple fifth sensing electrodes are identical to a part of the multiple third sensing electrodes, and the at least one sixth sensing electrode is identical to a part of or totally different from the at least one fourth sensing electrode.

Step S151: It is assumed that the parallel sensing touch control device 100 of this embodiment enters a low power mode at first. For example, within each detection interval, the first multiplexer MUXm is electrically connected to multiple first sensing electrodes among the plurality of sensing electrodes Sde of the capacitive sensor array 13, e.g., connected to the sensing electrodes <0> to <2> in a first detection interval T0, connected to the sensing electrodes <3> to <5> in a second detection interval T1, and so on referring to FIG. 5. For example, within each detection interval, the second multiplexer MUXp is electrically connected to multiple second sensing electrodes among the plurality of sensing electrodes Sde of the capacitive sensor array 13, e.g., connected to the sensing electrodes <3> to <5> in the first detection interval T0, connected to the sensing electrodes <6> to <8> in die second detection interval T1, and so on referring to FIG. 5. It is clear from FIG. 5 that the multiple first sensing electrodes and the multiple second sensing electrodes are different from each other but have a same number.

Step S153: When the DSP 19 identifies a touch event occurring on the capacitive sensor array 13 according to the digital signal, e.g., voltage change ΔV exceeding a voltage threshold, a normal mode is entered. In this embodiment, after the normal mode is entered, the parallel sensing touch control device 100 still identifies the touch position with the parallel number Nx>1, e.g., according to FIGS. 9-10 or FIGS. 11-13.

Example Using FIGS. 9-10

Step S155: In a first detection interval T0 of the normal mode, the first multiplexer MUXm is electrically connected to 2 third sensing electrodes (e.g., sensing electrodes <0> and <1>) among the plurality of sensing electrodes Sde of the capacitive sensor array 13, and the second multiplexer MUXp is electrically connected to 2 fourth sensing electrodes (e.g., sensing electrodes <1> and <2>) among the plurality of sensing electrodes Sde of the capacitive sensor array 13, wherein numbers of the third sensing electrodes and the fourth sensing electrodes are both larger than 1.

Step S157: In a second detection interval T1 of the normal mode, the first multiplexer MUXm is electrically connected to 2 fifth sensing electrodes (e.g., sensing electrodes <1> and <2>) among the plurality of sensing electrodes Sde of the capacitive sensor array 13, and the second multiplexer MUXp is electrically connected to 2 sixth sensing electrodes (e.g., sensing electrodes <3> and <4>) among the plurality of sensing electrodes Sde of the capacitive sensor array 13, wherein numbers of the fifth sensing electrodes and the sixth sensing electrodes are both larger than 1.

In this embodiment, the multiple fifth sensing electrodes are identical to a part of the multiple third sensing electrodes (e.g., sensing electrode <1>), and the at least one sixth sensing electrode is identical to a part of the at least one fourth sensing electrode (e.g., sensing electrode <3>) or totally different from the at least one fourth sensing electrode (e.g., sensing electrode <4>).

In this embodiment, a number of the multiple third sensing electrodes (e.g., sensing electrodes <0> and <1>) is identical to that of the at least one fourth sensing electrode (e.g., sensing electrodes <2> and <3>). A number of the multiple fifth sensing electrodes (e.g., sensing electrodes <1> and <2>) is identical to that of the at least one sixth sensing electrode (e.g., sensing electrodes <3> and <4>).

The connection in other detection intervals T2-T12 is referred to FIG. 9, and the identification of the touch position thereof is referred to FIG. 10. As they have been illustrated above, details thereof are not repeated herein.

Example Using FIGS. 11-13

Step S155: In a first detection interval T0 of the normal mode, the first multiplexer MUXm is electrically connected to 3 third sensing electrodes (e.g., sensing electrodes <1>, <2> and <3>) among the plurality of sensing electrodes Sde of the capacitive sensor array 13, and the second multiplexer MUXp is electrically connected to 1 fourth sensing electrode (e.g., sensing electrode <0>) among the plurality of sensing electrodes Sde of the capacitive sensor array 13, wherein a number of the third sensing electrodes is larger than 1 and a number of the fourth sensing electrodes is equal to 1.

Step S157: In a second detection interval T1 of the normal mode, the first multiplexer MUXm is electrically connected to 3 fifth sensing electrodes (e.g., sensing electrodes <0>, <2> and <3>) among the plurality of sensing electrodes Sde of the capacitive sensor array 13, and the second multiplexer MUXp is electrically connected to 1 sixth sensing electrode (e.g., sensing electrodes <1>) among the plurality of sensing electrodes Sde of the capacitive sensor array 13, wherein a number of the fifth sensing electrodes is larger than 1 and a number of the sixth sensing electrodes is equal to 1.

In the above Steps S151 and S157, it is possible that the first multiplexer MUXm is electrically connected to one sensing electrode, and the second multiplexer MUXp is electrically connected to three sensing electrodes, wherein a number of the sensing electrodes being connected herein is only intended to illustrate. In the present disclosure, the first multiplexer MUXm and the second multiplexer MUXp are electrically connected to different numbers of sensing electrodes, and the relationship between the detection interval having enough voltage change ΔV with respect to the touch position is previously coded and stored in a memory of the parallel sensing touch control device 100.

In this embodiment, the multiple fifth sensing electrodes are identical to a part of the multiple third sensing electrodes sensing electrode <2> and <3>), and the at least one sixth sensing electrode (e.g., sensing electrode <1>) is totally different from the at least one fourth sensing electrode (e.g., sensing electrode <0>).

In this embodiment, a number of the multiple third sensing electrodes (e.g., sensing electrodes <1>, <2> and <3>) is different from that of the at least one fourth sensing electrode (e.g., sensing electrode <0>). A number of the multiple fifth sensing electrodes (e.g., sensing electrodes <0>, <2> and <3>) is different from that of the at least one sixth sensing electrode (e.g., sensing electrode <1>).

The connection in other detection intervals T2-T15 is referred to FIG. 11, and the identification of the touch position is referred to FIGS. 12-13. As they have been illustrated above, details thereof are not repeated herein.

More specifically, according to those shown in FIGS. 5, 9 and 11, within each detection interval, the first multiplexer MUXm and the second multiplexer MUXp are electrically connected to different sensing electrodes, and at least one of the first multiplexer MUXm and the second multiplexer MUXp is electrically connected to more than one sensing electrode. Although FIGS. 5, 9 and 11 are all using a differential technique to remove common-mode nose, according to different objects such as lowering power consumption, improving sensitivity or multi touch detection, different parallel sensing can be performed using the method of FIG. 5, FIG. 9 or FIG. 11.

Referring to FIG. 16, it is an operational schematic diagram of a parallel sensing touch control device 100 according to another embodiment of the present disclosure. FIG. 16 shows that one scan is accomplished after 2 detection intervals T0-T1. That is, each scanning interval includes 2 detection intervals in this embodiment. Each detection interval corresponds to one connection state of the first and second multiplexers MUXm and MUXp.

It should be mentioned that values in the above embodiments such as electrode number, parallel number Nx, voltage value, excitation frequency are only intended to illustrate but not to limit the present disclosure.

As mentioned above, the conventional capacitive touch device preferably can cancel out common-mode noise and reducing power consumption to be adaptable to mobile electronic devices. Accordingly, the present disclosure further provides a parallel sensing touch control device (e.g., FIG. 1) and an operating method thereof (e.g. FIGS. 5, 9 and 11) that perform the differential operation on detected signals of multiple rows of detection cells within each detection interval to cancel out the common-mode noise. Meanwhile, as the number of detection intervals for detecting the capacitive sensor array is reduced due to the parallel sensing, the scanning interval of each frame is also shortened to reduce the total power consumption.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A parallel sensing touch control device, configured to be coupled to a capacitive sensor array comprising a plurality of sensing electrodes, the parallel sensing touch control device comprising:
   a first multiplexer, configured to be controlled by a first selection signal to electrically connect to at least one of the plurality of sensing electrodes, and output a first detected signal; and
   a second multiplexer, configured to be controlled by a second selection signal to electrically connect to at least one of the plurality of sensing electrodes, and output a second detected signal, wherein
   the first multiplexer and the second multiplexer are configured to electrically connect to different sensing electrodes all of which extend in a same direction in the capacitive sensor array, and
   in one detection interval, at least one of the first and second multiplexers is configured to electrically connect to more than one sensing electrode,
   a first single-ended amplifier, a second single-ended amplifier and a subtractor, wherein
   an output terminal of the first multiplexer is coupled to one input terminal of the first single-ended amplifier,
   an output terminal of the second multiplexer is coupled to one input terminal of the second single-ended amplifier, and
   the subtractor is coupled to output terminals of the first and second single-ended amplifiers to perform a differential operation on the first and second detected signals to output a differential signal.

2. The parallel sensing touch control device as claimed in claim 1, wherein in the detection interval, the first and second multiplexers are both configured to electrically connect to more than one sensing electrode, and a number of sensing electrodes coupled to the first multiplexer is identical to that coupled to the second multiplexer.

3. The parallel sensing touch control device as claimed in claim 2, wherein
   the first and second multiplexers are configured to electrically connect to a first group of sensing electrodes within a first detection interval, and connect to a second group of sensing electrodes within a second detection interval, and
   the sensing electrodes connected to, in the second detection interval, the first multiplexer are identical to the sensing electrodes connected to, in the first detection interval, the second multiplexer, but different from the sensing electrodes connected to, in the first detection interval, the first multiplexer.

4. The parallel sensing touch control device as claimed in claim 2, wherein
   the first and second multiplexers are configured to electrically connect to a first group of sensing electrodes within a first detection interval, and connect to a second group of sensing electrodes within a second detection interval, and
   the sensing electrodes connected to, in the second detection interval, the first multiplexer are identical to a part of sensing electrodes connected to, in the first detection interval, the second multiplexer, and identical to a part of sensing electrodes connected to, in the first detection interval, the first multiplexer.

5. The parallel sensing touch control device as claimed in claim 1, wherein within the detection interval, the first multiplexer is configured to electrically connect to more than one sensing electrode, and the second multiplexer is configured to electrically connect to one sensing electrode.

6. The parallel sensing touch control device as claimed in claim 5, wherein
   the first and second multiplexers are configured to electrically connect to a same group of sensing electrodes within a first detection interval and a second detection interval, and
   the second multiplexer is configured to electrically connect to different sensing electrodes among the same group of sensing electrodes within the first detection interval and the second detection intervals.

7. The parallel sensing touch control device as claimed in claim 1, further comprising:
   a low pass filter configured to filter the differential signal outputted from the subtractor;
   an analog to digital converter configured to convert the filtered differential signal to a digital signal; and
   a digital signal processor configured to identify a touch event or a touch position according to the digital signal, and generate the first selection signal and the second selection signal.

8. An operating method of a parallel sensing touch control device, the parallel sensing touch control device comprising a first multiplexer, a second multiplexer, a first single-ended amplifier, a second single-ended amplifier, a subtractor, a low pass filter, an analog to digital converter and a digital signal processor, and the parallel sensing touch control device being coupled to a capacitive sensor array comprising a plurality of sensing electrodes, the operating method comprising:
   entering a normal mode, in which the first multiplexer is electrically connected to one of the plurality of sensing electrodes and the second multiplexer is electrically connected to another one of the plurality of sensing electrodes in one detection interval of the normal mode;
   entering a low power mode when the digital signal processor identifies that there is no touch event within a predetermined time interval; and
   electrically connecting the first multiplexer to more than one sensing electrode of the plurality of sensing electrodes, and electrically connecting the second multiplexer to more than one sensing electrode of the plurality of sensing electrodes in one detection interval of the low power mode,
   wherein the first and second multiplexers are electrically connected to different numbers of different sensing electrodes,
   wherein, in the normal mode, the operating method further comprises:
   performing, by the subtractor, a differential operation on detected signals outputted from the first and second single-ended amplifiers to generate a differential signal;
   filtering, by the low pass filter, the differential signal;

converting, by the analog to digital converter, the filtered differential signal to a digital signal; and comparing the digital signal with a predetermined voltage threshold to identify at least one touch position.

9. The operating method as claimed in claim 8, wherein in the normal mode, the first and second multiplexers are electrically connected to two adjacent sensing electrodes.

10. The operating method as claimed in claim 8, wherein in the low power mode the operating method further comprises:

electrically connecting, within a first scanning interval, the first multiplexer to a first number of sensing electrodes, and electrically connecting, within a second scanning interval, the first multiplexer to a second number of sensing electrodes, wherein the first number is larger than the second number.

11. The operating method as claimed in claim 10, wherein a maximum value of the first number is a half of a number of the plurality of sensing electrodes of the capacitive sensor array, and a minimum value of the second number is 2.

12. The operating method as claimed in claim 10, wherein the parallel sensing touch control device further comprises drive circuits for driving the capacitive sensor array with different excitation frequencies, and in the low power mode the operating method further comprises:

driving, within the first scanning interval, the capacitive sensor array with a first excitation frequency, and driving, within the second scanning interval, the capacitive sensor array with a second excitation frequency, which is larger than the first excitation frequency.

13. An operating method of a parallel sensing touch control device, the parallel sensing touch control device comprising a first multiplexer, a second multiplexer, a differential charge amplifier, a low pass filter, an analog to digital converter and a digital signal processor, and the parallel sensing touch control device being coupled to a capacitive sensor array comprising a plurality of sensing electrodes, the operating method comprising:

entering a low power mode, in which the first multiplexer is electrically connected to multiple first sensing electrodes among the plurality of sensing electrodes and the second multiplexer is electrically connected to multiple second sensing electrodes among the plurality of sensing electrodes in one detection interval, wherein the multiple first sensing electrodes and the multiple second sensing electrodes are different from each other, and a number of the multiple first sensing electrodes is different from a number of the multiple second sensing electrodes;

entering a normal mode when the digital signal processor identifies a touch event;

electrically connecting, in a first detection interval of the normal mode, the first multiplexer to multiple third sensing electrodes among the plurality of sensing electrodes and electrically connecting, in the first detection interval, the second multiplexer to at least one fourth sensing electrode among the plurality of sensing electrodes; and electrically connecting, in a second detection interval of the normal mode, the first multiplexer to multiple fifth sensing electrodes among the plurality of sensing electrodes and electrically connecting, in the second detection interval, the second multiplexer to at least one sixth sensing electrode among the plurality of sensing electrodes, wherein the multiple fifth sensing electrodes are identical to a part of the multiple third sensing electrodes, and the at least one sixth sensing electrode is identical to a part of or totally different from the at least one fourth sensing electrode, wherein, in the normal mode, the operating method further comprises:

performing, by the differential charge amplifier, a differential operation on detected signals outputted from the first and second multiplexers to generate a differential signal;

filtering, by the low pass filter, the differential signal;

converting, by the analog to digital converter, the filtered differential signal to a digital signal; and comparing the digital signal with a predetermined voltage threshold to identify at least one touch position.

14. The operating method as claimed in claim 13, wherein a number of the multiple third sensing electrodes is identical to that of the at least one fourth sensing electrode, and a number of the multiple fifth sensing electrodes is identical to that of the at least one sixth sensing electrode.

15. The operating method as claimed in claim 13, wherein a number of the multiple third sensing electrodes is different from that of the at least one fourth sensing electrode, and a number of the multiple fifth sensing electrodes is different from that of the at least one sixth sensing electrode.

16. The operating method as claimed in claim 13, wherein a voltage value of the predetermined voltage threshold is larger than zero.

17. The operating method as claimed in claim 13, wherein a maximum value of a number of the first and second sensing electrodes is a half of a number of the plurality of sensing electrodes of the capacitive sensor array, and a minimum value of the number of the first and second sensing electrodes is 2.

* * * * *